United States Patent [19]

Simmons

[11] 4,029,931
[45] June 14, 1977

[54] SLIDING TABLE FOR RESISTANCE WELDING
[75] Inventor: Walter P. Simmons, Birmingham, Mich.
[73] Assignee: Tuffaloy Products, Inc., Sterling Heights, Mich.
[22] Filed: Oct. 31, 1975
[21] Appl. No.: 627,504
[52] U.S. Cl. .................................. 219/78; 219/79; 219/158
[51] Int. Cl.² .................. B23K 37/04; B21J 13/08
[58] Field of Search ............. 219/78, 79, 119, 158, 219/159, 86; 339/64, 65, 66 M

[56] References Cited
UNITED STATES PATENTS

| 1,752,598 | 4/1930 | Jorgensen | 219/159 X |
| 2,211,186 | 8/1940 | Weston | 219/158 X |

Primary Examiner—E. A. Goldberg
Assistant Examiner—N. D. Herkamp
Attorney, Agent, or Firm—William T. Sevald

[57] ABSTRACT

A base is mounted on a welding machine and has slide rails. Each rail has paired flat top sides angularly converging upwardly toward one another. A table has slide channels also each having paired flat sides angularly converging upwardly toward one another at angles substantially equal to that of the rails. The table channels rest on the rails with their flat sides in sliding relationship to the flat sides of the rails. When welding forces are applied to the table, the flat sides of the rails and channels jam or wedge into substantially solid electrical contact at their interface due to their angulation. A shield is attached to the end of the table and covers the rails in their exposed projection beyond the table. In a table having two welding locations, a shield is attached at both ends of the table. The shields protect the rails against welding spatter, dust, etc., to keep the rails clean to insure maximum electrical contact. The sliding table allows a workman to load and unload workpieces outside of the welding area which substantially reduces the likelihood of accidental injury.

5 Claims, 4 Drawing Figures

SLIDING TABLE FOR RESISTANCE WELDING

BACKGROUND OF THE INVENTION

In resistance welding it is necessary to have welding circuits which supply the welding current to the workpiece with reliable conductivity. Fixed connections are the standard of the industry as they produce the better welds and use less current.

On the other hand, with fixed connections, the loading and unloading of workpieces occurs in the same location as the welding so that the operator must work closely adjacent to or in the welding area where the welding occurs and where the electrodes are forcibly projected by the machine. This creates a danger of injury for the operator.

The problem of providing safe loading and unloading positions for the workman remote from the welding area while at the same time providing optimum welding circuits for welding appears to be unsolved in the prior art by the provision of acceptable means which industry can use commercially.

SUMMARY OF THE PRESENT INVENTION

With the foregoing in view, it is an object of the invention to provide a sliding table for resistance welding machines so that the welding station may be moved into the welding position for welding with reliable electrical conductivity and moved to a remote position for loading and unloading workpieces to reduce the danger of accidental injury to the operator.

It is an object of the invention to provide means for sliding the table which wedge or jam against one another under the forces employed in welding to provide a solidly connected welding circuit and which release absent the welding forces allowing the table to slide.

An object of the invention is to provide a base connectable to a welding machine and rails mounted on the base having opposite flat sides lying at an angle to one another and converging upwardly toward one another.

An object of the invention is to provide a table having complementary angled slide channels for receiving rails in close interfitting relationship.

An object of the invention is to utilize the angularly engaging rails and channels to develop a moveable relationship between them which is normal to their sliding motion to allow them to move slightly toward one another to a wedged or jammed condition under welding forces for conducting welding current and to allow them to release absent the welding forces to facilitate sliding the table on the rails.

An object of the invention is to provide a shield on and moving with the table to cover exposed portions of the rails extending beyond the table to protect the rails from welding spatter, dust, etc., to insure good current conducting surfaces.

An object of the invention is to provide a table having one or more welding stations so that when one is in the welding position, the other is in the loading-unloading position spaced from the welding operation.

These and other objects of the invention will become apparent by reference to the description of the illustrated embodiment taken in connection with the accompanying drawing.

DETAILED DESCRIPTION OF THE ILLUSTRATED EMBODIMENT

Figure 1:
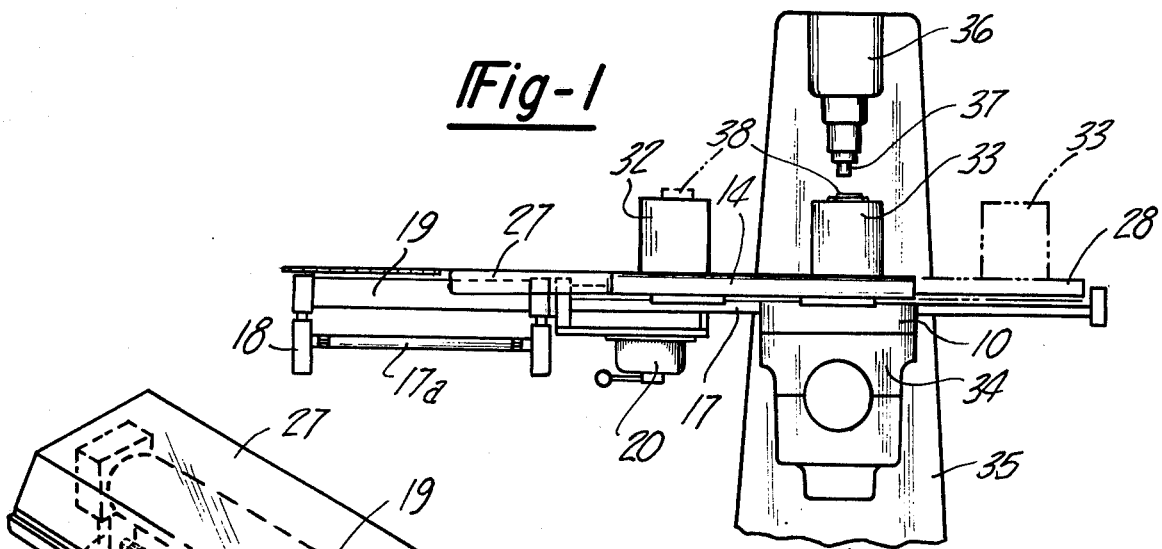
FIG. 1. is a front elevational view of a welding machine equipped with the slide table apparatus of the invention with the table shown in side elevation and including a power cylinder for moving the table, controls for operating the cylinder, shields at both ends of the table with the shield at the left broken away to show the cylinder, and showing two welding stations on the table in solid lines and illustrating a loading-unloading position in broken lines.
Figure 2:
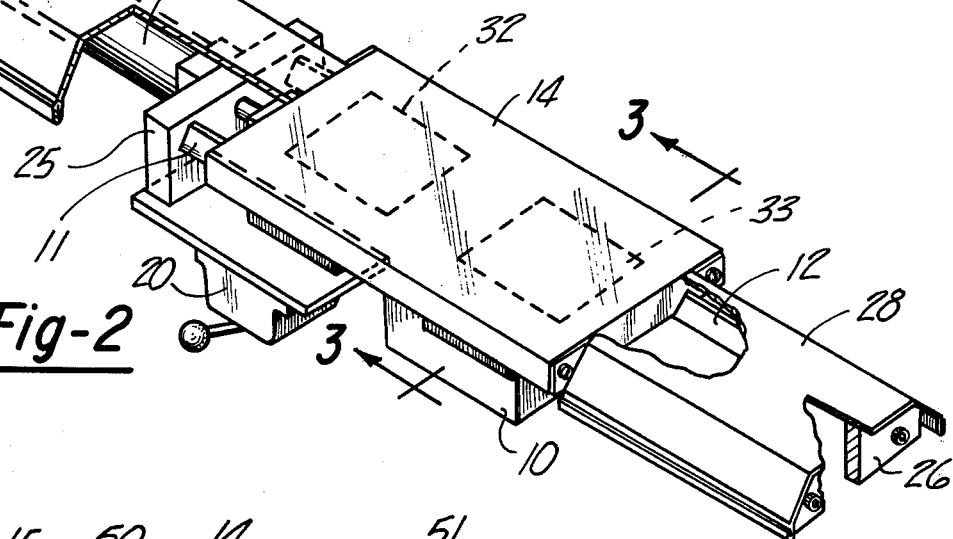
FIG. 2 is an enlarged top front oblique perspective view of the slide table apparatus seen in FIG. 1, with portions broken away to show internal structure; and indicating the welding stations in broken lines.

Referring now to the drawing wherein like reference numerals refer to like and corresponding parts throughout the several views, the slide table apparatus shown therein illustrates a preferred embodiment of the invention and comprises a base 10. A table 14 surmounts the rails 11 and 12. The table 14 is equipped with channels 15 and 16 which receive and interfit with the rails 11 and 12 respectively. An arm 17, 17a extends from the base 10 and terminates in an outer end 18. A power cylinder 19 is connected between the outer end 18 of the arm 17 and the table 14. Controls 20 are mounted on the arm 17 for actuating the cylinder 19 to slide the table 14 on the rails 11 and 12. The rails 11 and 12 are secured to the base 10 by the hold down bolts 21 and 22. The table 14 is slideably secured to the rails 11 and 12 by the gibs 23 and 24 which are bolted to the table 14 and engage the under side of the rails 11 and 12. The rails 11 and 12 extend outwardly from the base 10 and are cross-tied at their outer ends by the cross pieces 25 and 26.

Figure 3:
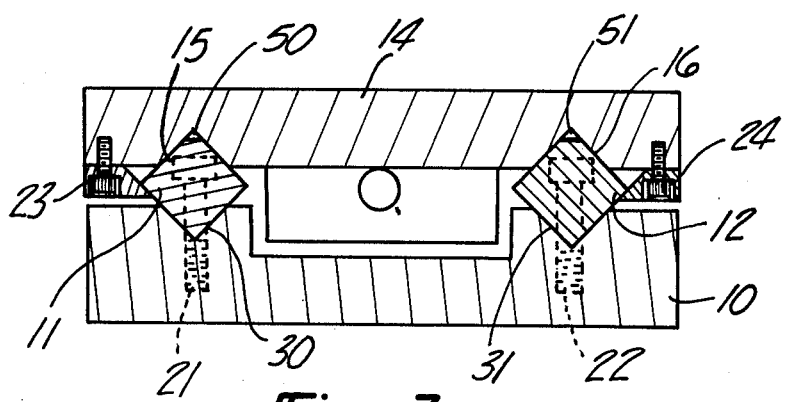
FIG. 3, is an enlarged cross-sectional view of the apparatus seen in FIG. 2, taken on the line 3 – 3 thereof, showing the engagement of the angularly faced slide rails and channels.
Figure 4:
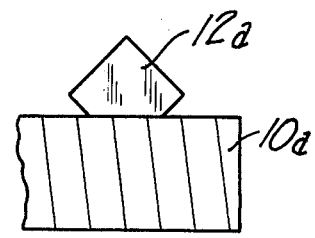
FIG. 4, is an end view of a rail and a portion of the base showing a modification of the mounting of the rail on the base and showing the base broken away.

A shield is mounted on one end of the table 14 and a shield 28 is mounted on the other end of the table 14. The shields 27 and 28 overlie and protect the rails 11 and 12 in their exposed areas when the table 14 is moved. The rails 11 and 12 preferably are made of square copper bar stock. V-sockets 30 and 31 are formed in the base 10 and receive the bottom corner of the rails 11 and 12 respectively, FIG. 3, the bottom of the rails also may be flat as shown in FIG. 4 where the rail 12 also has a flat bottom which engages the flat top on the base 10d. The table 14 is made of copper and thus the slide channels 15 and 16 and the rails 11 and 12 provide copper to copper electrical contact. A welding station block 32 and a welding station block 33 are mounted on the table 14. The rails 11, 12 and the channels 15, 16 may be silver plated.

The base 10 is mounted on the welding platen 34 of the welding machine 35 below the welding head 36. An electrode 37 on the welding head 36 engages the workpiece 38 on the welding station block 32, 33 when the automatic welding cycle is actuated, not shown.

In use, the operator actuates the welding cycle and the head 36 forces the electrode 37 against the workpiece 38 on the station block 33 and the force applied is transferred to the table 14 forcing the channels 15 and 16 into jammed contact with the rails 11 and 12 respectively during the application of welding current so that the current is conducted without reduction or obstruction at the slide channels 15 and 16 and the rails 11 and 12.

After the workpiece 38 is welded and the welding cycle terminated, the operator places a workpiece on station block 32 and actuates the cylinder 19 via the controls 20 to move the table 14 from the solid line position shown in FIG. 1. to the position indicated by broken lines. This locates the station block 33 and welded workpiece outwardly of the head 36 and locates the station block 32 and new workpiece under the head 36. The operator actuates the welding cycle and the new workpiece is welded. He then removes the welded workpiece from the station block 33 and replaces it with a new workpiece. He then actuates the cylinder 19 to move the table 14 from the position indicated by broken lines to the solid line position shown. He now actuates the welding cycle and repeats his performance as previously described.

To insure and/or provide for transverse sliding movement of the channels 15 and 16 downwardly on the rails 11 and 12 under the forces exerted by the welding head 36, the top corner of the rails may be milled off to provide a small longitudinal cavity 50 and 51 between the table 14 and the rails 11 and 12. This eliminates corner-to-corner contact and allows for more wedge-like engagement and action between the rails 11 and 12 and the channels 15 and 16. It will be understood that very small movement is all that is necessary to effect wedging action and/or a jammed condition between the rails 11 and 12 and the channels 15 and 16 which condition is relieved by the removal of the force exerted by the welding head 36. Also the table may be moved manually or as desired.

It will be understood also that the table may be equipped with a single station block and/or travel toward and away from the machine as well as travel from side-to-side relative to the machine as shown and that a bottom electrode may be employed on the table instead of the station block shown, singly and in combination, also the slide channels may be formed by adding parts to the table. The scope of the invention is limited only by the appended claims.

I claim:

1. A sliding, current conducting, work-piece holding, movable table for a resistance welding machine providing reliable conductivity in the welding position and a loading-unloading station spaced from the welding position to eliminate danger of injury to the operator, comprising,
    a base mountable on a resistance welding machine below the welding head,
    at least two horizontal slide rails lying on and over said base and extending laterally outwardly of said base on at least one side of said base beyond the welding head; each said rail having a bottom portion connected to said base and an upwardly extending top portion;
    said top portion of each said rail comprising opposite flat sides lying on opposite angles converging upwardly toward one another,
    a table over-lying said slide rails; said table having means forming bottom slide channels partially receiving said top portions of said slide rails,
    each said slide channel having opposite flat sides lying on opposite angles converging upwardly into said table;
    the angulation of said sides of said slide rails and the angulation of said sides of slide channels being substantially equal to provide a close interfit therebetween to provide a large area of mutual contact to facilitate transfer of welding current:
    said table being slidable on said rails between a welding position below a welding head and a loading-unloading position outwardly of a welding head:
    said slide rails and said slide channels under the force exerted by the welding head being jammed in substantially solid electrical contact due to their mutual angular interface allowing slight motion toward one another from a slidable to a jammed condition.

2. In apparatus as set forth in claim 1, said sides of said slide rails being truncated at their apex to provide space for slight motion between the flat surfaces of said slide rails and said slide channels toward one another to facilitate a jammed condition of their surfaces.

3. In apparatus as set forth in claim 1, said rails extending beyond said table when said table is in the welding position, and
    a shield on said table overlying the extension of said rails when exposed beyond said table to protect said rails from welding spatter, dust, etc.

4. In apparatus as set forth in claim 1, said table having two welding stations;
    said slide rails extending on opposite sides of said base; said table being slidable on said rails between a first condition locating one station at the welding position and the other station at the loading-unloading position and a second condition locating the one station at the loading-unloading position and the other station at the welding position.

5. In apparatus as set forth in claim 4, said table having opposite ends; said rails extending beyond said table at one said opposite end when said one station is in said first welding condition; said rails extending beyond said table at said other opposite end when said other station is in said second welding condition;
    a first shield on said table at one said end and a second shield on said table at the other said end; said shields covering the extension of said rails when exposed at said opposite ends of said table.

* * * * *